(12) United States Patent
Brennan et al.

(10) Patent No.: US 11,465,915 B2
(45) Date of Patent: *Oct. 11, 2022

(54) SYSTEM FOR CONTROLLING WATER USED FOR INDUSTRIAL FOOD PROCESSING

(71) Applicant: SMARTWASH SOLUTIONS LLC, Salinas, CA (US)

(72) Inventors: James M. Brennan, Pleasanton, CA (US); Danny Elmer Lindstrom, Rio Vista, CA (US); Christopher Michael McGinnis, Seaside, CA (US); Eric Child Wilhelmsen, Milpitas, CA (US)

(73) Assignee: SMARTWASH SOLUTIONS LLC, Salinas, CA (US)

( * ) Notice: Subject to any disclaimer, the term of this patent is extended or adjusted under 35 U.S.C. 154(b) by 639 days.

This patent is subject to a terminal disclaimer.

(21) Appl. No.: 16/050,476

(22) Filed: Jul. 31, 2018

(65) Prior Publication Data

US 2018/0334392 A1 Nov. 22, 2018

Related U.S. Application Data

(63) Continuation-in-part of application No. 15/723,809, filed on Oct. 3, 2017, and a continuation-in-part of
(Continued)

(51) Int. Cl.
*C02F 1/00* (2006.01)
*A23N 12/02* (2006.01)
(Continued)

(52) U.S. Cl.
CPC .............. *C02F 1/008* (2013.01); *A23N 12/02* (2013.01); *B01D 29/52* (2013.01); *B01D 29/60* (2013.01);
(Continued)

(58) Field of Classification Search
CPC .......... C02F 1/008; C02F 1/004; C02F 1/686; C02F 1/001; C02F 1/66; C02F 1/76;
(Continued)

(56) References Cited

U.S. PATENT DOCUMENTS 4,427,772 A * 1/1984 Kodera .............. G01N 27/4163
204/403.14
5,462,678 A 10/1995 Rosaen
(Continued)

FOREIGN PATENT DOCUMENTS

DE 202015101756 U1 7/2016
EP 1248102 A1 10/2002
(Continued)

OTHER PUBLICATIONS

International Search Report/Written Opinion issued in PCT/US2017/054960 dated Dec. 11, 2017.
(Continued)

*Primary Examiner* — Akash K Varma
(74) *Attorney, Agent, or Firm* — Patterson + Sheridan LLP

(57) ABSTRACT

A sensor control system of a food processing system includes a logic processor operatively coupled to an electrode. The logic processor is configured to receive a sensor signal from the electrode, the electrode configured to collect the sensor signal from water used within the food processing system, process the sensor signal to determine a chemical measurement of the water, and generate an electrochemical cleaning control signal for the electrode to interact with the water to electrochemically clean the electrode based upon a user input signal.

24 Claims, 13 Drawing Sheets

Related U.S. Application Data application No. 14/875,144, filed on Oct. 5, 2015, now Pat. No. 10,499,679.

(60) Provisional application No. 62/403,322, filed on Oct. 3, 2016, provisional application No. 62/060,325, filed on Oct. 6, 2014.

(51) Int. Cl.
  *B01D 29/60* (2006.01)
  *B01D 29/52* (2006.01)
  *C02F 1/68* (2006.01)
  *C02F 103/32* (2006.01)
  *C02F 1/76* (2006.01)
  *C02F 1/66* (2006.01)

(52) U.S. Cl.
  CPC ............ *C02F 1/004* (2013.01); *C02F 1/686* (2013.01); *C02F 1/001* (2013.01); *C02F 1/66* (2013.01); *C02F 1/76* (2013.01); *C02F 2103/32* (2013.01); *C02F 2209/008* (2013.01); *C02F 2209/06* (2013.01); *C02F 2209/29* (2013.01)

(58) Field of Classification Search
  CPC ...... C02F 1/00; C02F 1/68; C02F 1/50; C02F 1/44; C02F 1/78; C02F 2209/008; C02F 2209/06; C02F 2209/29; C02F 2209/10; C02F 2209/11; C02F 9/00; C02F 2103/32; B01D 29/52; B01D 29/60; A23N 12/02
  USPC ......................................................... 210/739
  See application file for complete search history.

(56) References Cited

U.S. PATENT DOCUMENTS

| | | | |
|---|---|---|---|
| 5,697,366 | A | 12/1997 | Kimball et al. |
| 6,438,501 | B1 | 8/2002 | Szecsody et al. |
| 7,857,506 | B2 | 12/2010 | Schick et al. |
| 2010/0047414 | A1 | 2/2010 | Terranova |
| 2011/0008866 | A1* | 1/2011 | Dibel .................... B01D 61/20 435/183 |
| 2011/0079520 | A1* | 4/2011 | Tretheway .......... C02F 1/46104 205/744 |
| 2011/0247655 | A1* | 10/2011 | Lewis .................... A23B 7/158 134/18 |
| 2012/0000488 | A1* | 1/2012 | Herdt .................. C11D 3/0047 134/18 |

FOREIGN PATENT DOCUMENTS

| | | | | |
|---|---|---|---|---|
| GB | 2319614 | A | * 11/1996 | ........... G01N 27/416 |
| GB | 2319614 | A | 5/1998 | |
| JP | 2004191197 | A | 7/2004 | |
| KR | 100742843 | B1 | 7/2007 | |
| WO | 2003065032 | A2 | 8/2003 | |
| WO | 2006043900 | A1 | 4/2006 | |
| WO | 2010045362 | A2 | 4/2010 | |
| WO | 2011001335 | A1 | 1/2011 | |
| WO | 2016013586 | A1 | 1/2016 | |

OTHER PUBLICATIONS

European Search Report issued in 15848296.8 dated Apr. 25, 2018.
European Search Report issued in 17859030.3 dated May 26, 2020.
European Search Report issued in 17859030.3 dated Jan. 14, 2022.
Examination Report dated May 10, 2022, corresponding to New Zealand Application No. 774827.

* cited by examiner ered using a number of different methods and system to try

SYSTEM FOR CONTROLLING WATER USED FOR INDUSTRIAL FOOD PROCESSING

CLAIM OF PRIORITY UNDER 35 U.S.C. § 119

The present application for patent claims benefit of U.S. Provisional Patent Application Ser. No. 62/060,325 filed on Oct. 6, 2014, and claims benefit and is a continuation-in-part of U.S. patent application Ser. No. 14/875,144 filed on Oct. 5, 2015, each of which are assigned to the assignee hereof and hereby expressly incorporated by reference herein. The present application for patent also claims benefit of U.S. Provisional Patent Application Ser. No. 62/403,322 filed on Oct. 3, 2016, and claims benefit and is a continuation-in-part of U.S. patent application Ser. No. 15/723,809 filed on Oct. 3, 2017, each of which are also assigned to the assignee hereof and hereby expressly incorporated by reference herein.

BACKGROUND

Field of the Disclosure

The subject matter disclosed herein generally relates to food processing and, more particularly, to controlling water chemistry used for industrial food processing.

Description of Related Art

Water is used in many food processes. For example, water is often used to wash produce at different stages of processing. In many cases this water is recycled and used multiple times. This is particularly true of the wash processes including those used in the value added produce industry. It is important to assure that this water does not add to the food safety hazards that might be associated with the food being processed. Accordingly, the water is controlled and moni-
and reduce any food safety concerns. The control requirements will vary with the food product being processed and the process.

Water chemistry management has been evolving with increased automation and improvements in instrumentation. There are still operations that use test strips and manual wet chemistry methods but these are increasingly inadequate. To address these needs, more sophisticated controllers have come into play with more logic. Even with these developments, more efficient and reliable approaches are needed. It is also increasingly important to validate control.

SUMMARY

The systems, methods, apparatus, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved food safety.

Certain aspects provide a control system for controlling water used in a food processing system. The control system generally includes at least one sensor configured to collect a sensor signal from a produce handling device, a logic processor configured to receive the sensor signal collected by the at least one sensor and generate a control signal for controlling adding wash solution to the water used in the food processing system, and a human machine interface (HMI) configured to display information from the logic processor to a user.

Certain aspects provide a control system for controlling water used in a food processing system. The control system generally includes at least one processor configured to execute computer readable instructions. The computer readable instructions include collecting, using a sensor disposed at the food processing system, a sensor signal, generating one or more control signals for controlling one or more chemical pumps and one or more valves to provide a wash solution into the water of the food processing system based on the sensor signal, and transmitting the one or more control signals to the one or more chemical pumps and one or more valves. The control system may further include a memory coupled to the at least one processor and configured to store one or more of the computer readable instructions, the one or more control signals, and the sensor signal.

Certain aspects provide a non-transitory computer program product for controlling water used in a food processing system. The non-transitory computer program product generally includes a computer readable storage medium having program instructions embodied therewith. The program instructions, executable by a processor, cause the processor to collect, using a sensor disposed at the food processing system, a sensor signal, generate, using a processor, one or more control signals for controlling at least one of a fouling control device, one or more chemical pumps, and one or more valves of a control system to provide a wash solution into the water based on at least the sensor signal, and operate at least one of the fouling control device, the one or more chemical pumps, and the one or more valves based on the one or more control signals.

Aspects generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
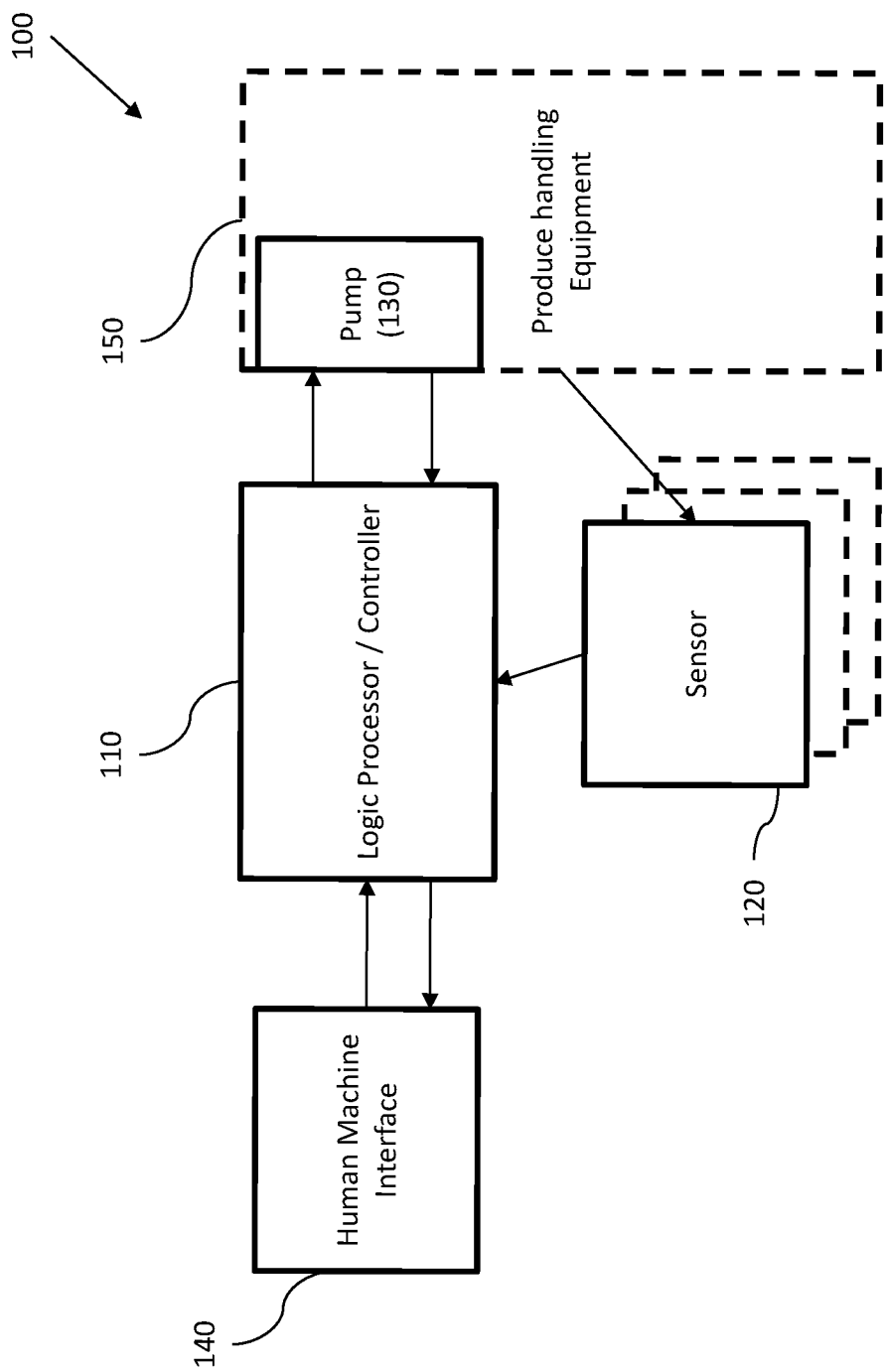
FIG. 1 is a block diagram of a control system for water used in produce processing that includes a water control system and produce wash equipment, in accordance with certain aspects of the present disclosure.

Aspects of the present disclosure provide apparatus, methods, processing systems, and computer readable mediums for controlling water chemistry used for industrial food processing.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Embodiments described herein are directed to a system and method for controlling a wash solution in a wash system for produce handling. For example, according to one or more embodiments, a system and method include data collection using one or more sensors and generating control signals, based on the collected data, to control chemical pumps that adjust the amount of one or more chemicals in water used to wash produce that is being processed. The system can also include user input data as well has historical databases and analysis that can be used to generate the control signals. The control signals can also be generated based on the collected data, stored data, analysis, user input, a combination of data types, and/or other related data. Further, the control signals can also be generated for fouling the sensors and related components based on the collected data, stored data, analysis, user input, a combination thereof, and/or other related data. Additionally, the control signals can further include scheduling the fouling based on the collected data, stored data, analysis, user input, a combination thereof, and/or other related data.

According to one or more cases, a number of elements are included in a control system for a value added produce wash system. Some of these elements relate to monitoring water attributes while others relate to the performance of the monitoring system itself. Other elements relate to monitoring the status of the food process.

For example, in some cases, the control system may include at least two channels of monitoring. These channels provide control to allow control of a primary stage and secondary stage present in many wash systems. In some cases, one or more pH monitoring devices for each stage may be provided. A pH monitoring device can include an electrode that is suitable for a food contact situation. One or more coulometric chlorine electrodes for each stage may be provided in some cases. The effluent from such electrodes is often dumped rather than returned to use. In some cases, temperature monitoring for correcting pH measurements and chlorine measurements based on projected values of both when at that temperature may be provided.

In some cases, another element that may be included in an apparatus, system, and/or method for controlling a wash solution in a wash system for produce handling includes a relay to stop product feed if chlorine is out of specification for either stage. Similarly, product feed may be halted if pH is outside of the desired range. In some cases, a wired or wireless full duplex data communication with basic trend monitoring and reporting may be provided. Further, in some cases, another element that can be included is a memory location for storing all or some of the collected data along with other indicators. The data stored can include a subset of select data that is being collected. For example, key data can be backed up locally with a USB flash drive.

According to one or more cases, an electrode fouling control system including filtration and specific fouling removal processes may be included. Fault trapping in data analysis, may be used to monitor the water flow by a pH electrode and a chlorine electrode. Additionally, in one or more embodiment, it may be useful to insure that a fouling control device, for example a Clean-In-Place (CIP) air pressure device, is present and that water is circulating in the wash system.

In other cases, other fouling control devices such as clean-in-place embodiments may be provided that include flushing an electrode/sensor with a liquid wash solution such as, for example, an acid solution or some other food safe cleaning agent. A single clean-in-place device may be provided that is connected to each electrode such that the device is able to provide the cleaning air/gas and/or liquid as described herein. In another case, the clean-in-place device may be configured such that it can be connected when needed and disconnected from each electrode/sensor when not needed. In another case, each electrode/sensor may have its own specific clean-in-place device connected to the electrode/sensor. The clean-in-place device may therefore contain cleaning solution that is specifically tailored for the electrode/sensor. Further the device may further provide the ability to also provide a calibration solution when selected. Additionally, in some cases, when the clean-in-place device provides pressurized air/gas for cleaning, the pressure can be tailored specifically for the electrode/sensor to which the device is connected.

According to one or more cases, one or more touch screen interfaces can be provided for user input in the wet environment of a plant and allows substantial flexibility in input locations. Alternatively, a traditional mouse and/or keyboard can be provided. Further, microphones could be provided to capture audio commands and/or cameras can be included to capture user gestures that can correspond to select inputs and defined by the user and understood by the system.

According to some cases, another element that can be included is a relay that stops chlorine addition of the pH exceeds a threshold. For example, a facility safety is enhanced if there is a relay provided that can stop chlorine addition if the pH exceeds 7, which can be defined as a domain outside of the normal operating conditions. Similarly, one can set a lower bound to prevent or reduce the hazards of chlorine outgassing.

Further, additional elements can be included in the system and/or method for controlling a wash solution in a wash system for produce handling. For example, in accordance with one or more embodiments, sensor data and analysis data generated using the sensor data can be stored in memory somewhere in or connected to the system. Further, control signals and operational parameters can be generated and stored in memory as well. In accordance with one or more embodiments, a firewall panel is included in the system to allow external systems to view what is stored in the memory or database such as operational parameters without access to control features. Accordingly, the firewall panel can prevent unauthorized changes in operating parameters. In one or more cases, a memory coupled to at least one processor may be configured to store one or more of computer readable instructions, one or more control signals, and one or more sensor signals.

A graphical user interface may be shown on a computer display that a user, such as a machine operator, plant supervisor, etc., uses to view the data from the database such as the sensor data and operational parameters. However, the firewall panel prevents the user from inputting control signals by discarding any input from the user that attempts to adjust the operational parameters and/or is detected by the firewall panel as a disallowed input.

A web portal interface that may be provided to a user that is off-site such as a customer or corporate company leadership. When the user connected using the web portal over the internet from a remote location in relation to the position of the system, the user is give certain privileges. For example, the user can be provided with access to view data stored in a database of the system. However, a firewall panel can be provided that disallows the user from inputting control commands that attempt to, for example, change the operational parameters of the system. Thus, the user is can be granted viewer rights only through the use of the firewall panel. According to another embodiment, the firewall panel can provide some control of certain select items such requesting that following of the sensors be executed, or that new data points be collected by the sensors and processed. In another embodiment, the firewall panel can prevent all action and only provide the user visual access.

A system and/or method for controlling a wash solution and pH deviations may be provided. A pH deviation includes using a pH sensor and a pH chemical pump. For example, a pH deviation to a desired value can be detected by the pH sensor. This data can then be analyzed to determine and generate a control signal that defines the operating parameters of a pH chemical pump. The signal is then transmitted to the pH chemical pump which adjusts the amount of chemical based on the reviewed data in order to balance out the data from the sensor readings.

One or more sensors and controllers may be added to the product feed control loop to more stringently control the proceeding operations in accordance with one or more cases. Additionally, full feedback is reported to the controller about the status of product feed to assure that the control relay is not circumvented and prevent inappropriate processing. The controller assesses whether the product feed is as expected given the status of the water chemistry.

A split line control may be provided in accordance with one or more cases. This element may allow the two control channels to control either a two-stage wash line, a one-stage wash line or two one-stage lines. According to other embodiments, additional channels can be included in excess of two.

According to one or more cases, a proportional integral derivative (PID) controller with, for example 5 to 10 second control loops can be used to control the chemical pumps of the overall system. This allows the system to maintain the desired control and consistency in the water chemistry. The PID controller further allows for slow and fast acting sanitizer changes and better tuning of control. Further, according to one or more embodiments, controlling the speed of response provided the control system the ability to vary the degree of anticipation and response that corresponds with the produce wash equipment specification and/or produce characteristics. For example, cleaning carrots can sometimes be done with a longer respond time to chemical amount shifts while onions require a faster response to changes detected by one or more sensors. The control system can set the pump frequency and/or rate and stroke length to control the amount of chemical added as well as the timing. Further, a time interval may be selected for pumping based on the sensor provided information.

A redundant transient storage solution may be provided that can provide data integrity and protection, in accordance with one or more cases. For example, a two tiered backup solution can be implemented that uses local storage devices and a USB drive that can be plugged into any of the control system elements and then move and plugged into another element.

According to one or more cases, sensor fouling with limited interruption of data for cleaning may be provided that improves the fouling control system. According to one or more embodiments, a number of different elements can be provided that increase effectiveness. For example, switching from an elapsed time clock to a daily clock for chlorine electrode electrochemical cleaning can be provided. This change in clock cycle insures that the chlorine electrodes may start each day of production without fouling. According to another embodiment, another element that can be provided is adding feedback to the controller to confirm that chlorine electrode was cleaned allowing verification rather than assuming the cleaning cycle was complete. Further, according to another embodiment another element that can be included is cascading a designed for purpose filter. This may include a set of cascading filters that may include a first filter connected in parallel with a second filter. These filters may be of a tangential flow design to extend operating time. This allows greater tolerance for interfering materials including fats and oils that are present in meat and poultry operations.

According to other cases, to increase the utility of the system and the cloud based data, more powerful analysis tools may be added and calibration data collected. According to one or more embodiments, a calibration report is generated to statistically guide the decision to adjust the output from the chlorine system to accurately report chlorine concentration without correction that just add noise to the data stream. The cloud data from multiple plants and lines allows development of metric for performance comparisons such as degree of control, hours of in control operation and the absence of outliers. According to another embodiment, the cloud based data can be used to generate certificates of performance to demonstrate that the line was operating correctly.

Figure 10:
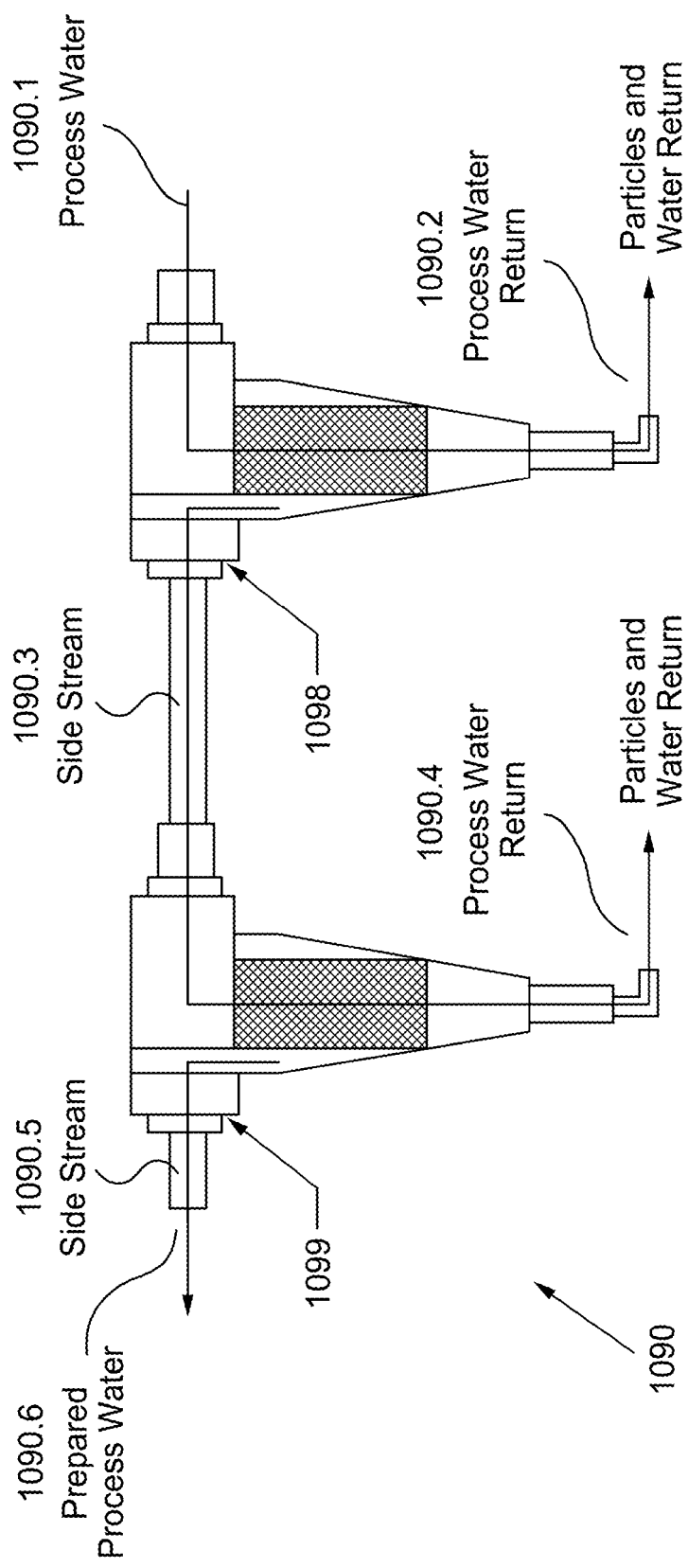
FIG. 10 is an illustration of a set of filters used in a control system for water used in produce processing, in accordance with certain aspects of the present disclosure.

Given the importance of particle removal to fouling control of the electrodes, it is instructive to examine the filtration in greater detail that can be provided in accordance with one or more embodiments. For example, according to one or more embodiments, the filter housing and design look familiar but the fluid flow has been changed to provide by-pass flow to continuously clear the faces of the screens and filters as shown in FIG. 10 below. According to one or more embodiments, when filters of this type are cascaded they are even more effective and provide longer operating windows before cleaning is necessary. This filtration coupled with Clean-In-Place (CIP) airflow, or another clean-in-place device, is enough to maintain the pH electrodes. The coulometric chlorine electrode requires electrochemical cleaning. For example, electrochemical cleaning of the electrode may include reversing a polarity of the electrode or changing a potential applied to the electrode such that the electrode interacts with the water of the food processing system to be electrochemically cleaned.

In accordance with one or more embodiments, the improved calibration process uses a calibration and verification process to assure the accuracy of the sensor electrodes. Further, according to one or more embodiments, a new controller can be put into service when the electrode response has drifted to outside of the acceptable range as determine by the verification process which utilizes a t-test as a decision making tool (the ratio of the difference to variance corrected for the number of measurements). This data can be manually entered into the cloud data system where the reporting decision reports the results reducing the human decisions.

Figure 7:
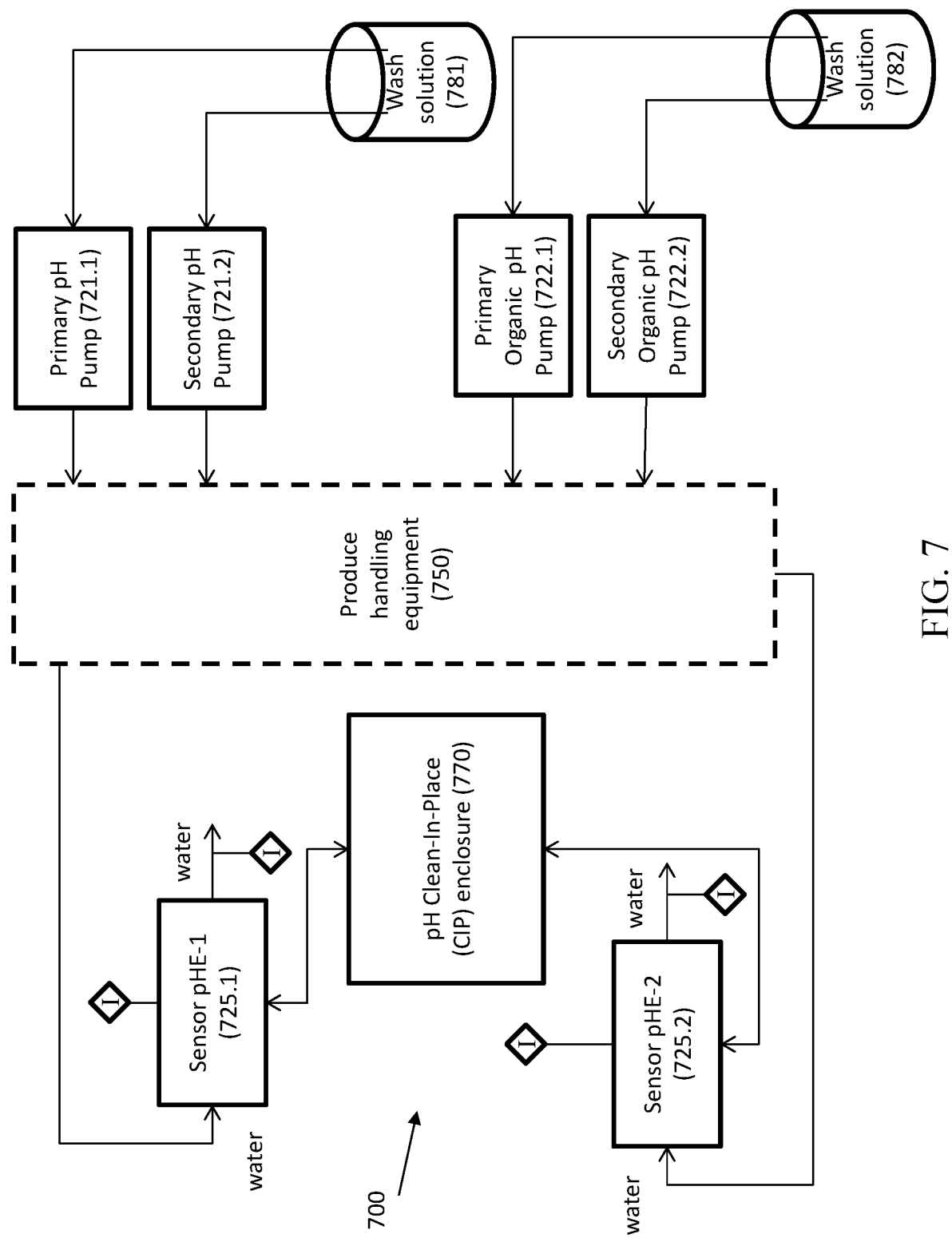
FIG. 7 is a block diagram of a control system for water used in produce processing that controls water pH for washing produce, in accordance with certain aspects of the present disclosure.
Figure 8:
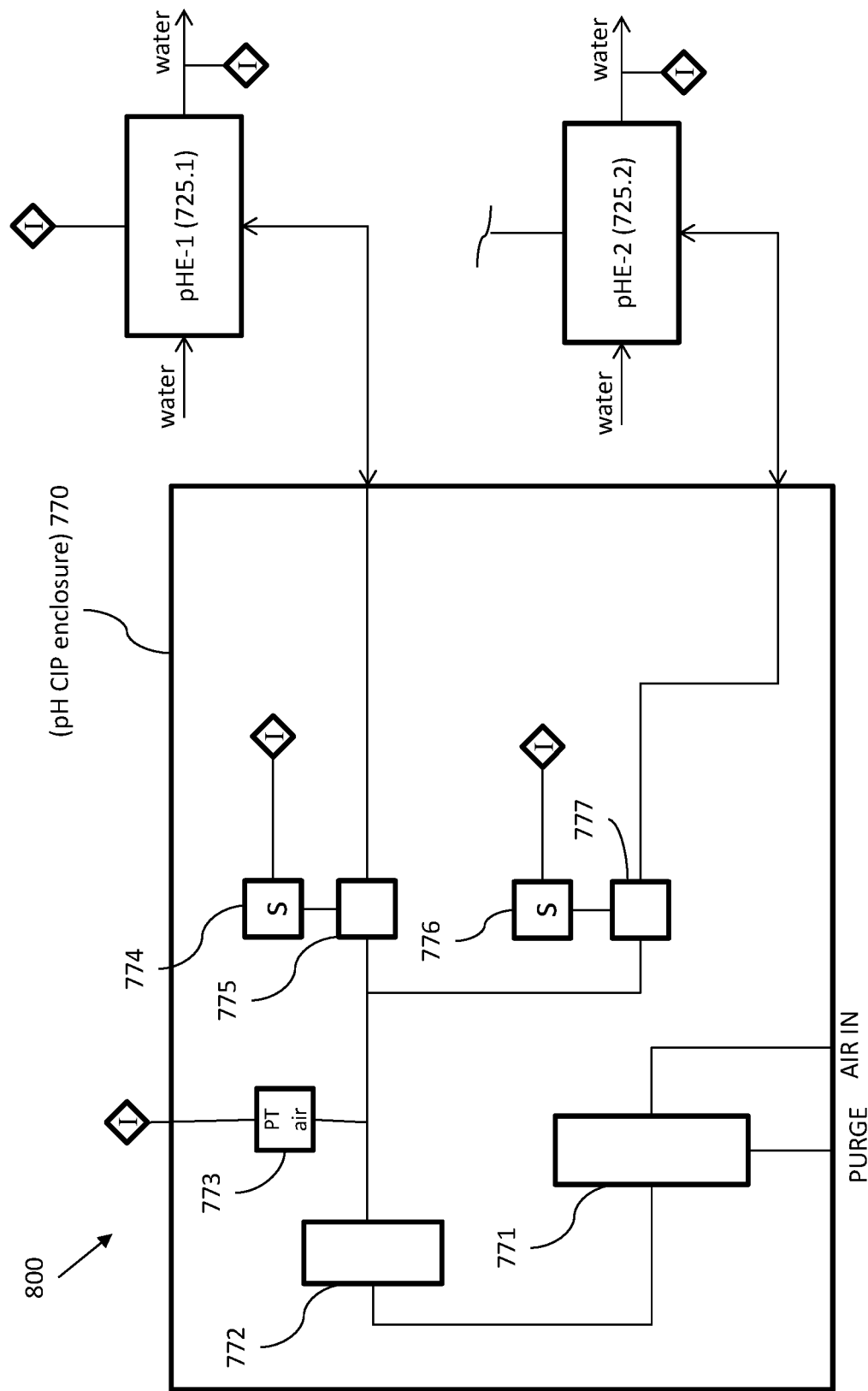
FIG. 8 is a block diagram of a pH Clean-In-Place (CIP) enclosure of a control system for water used in produce processing, in accordance with certain aspects of the present disclosure.
Figure 9:
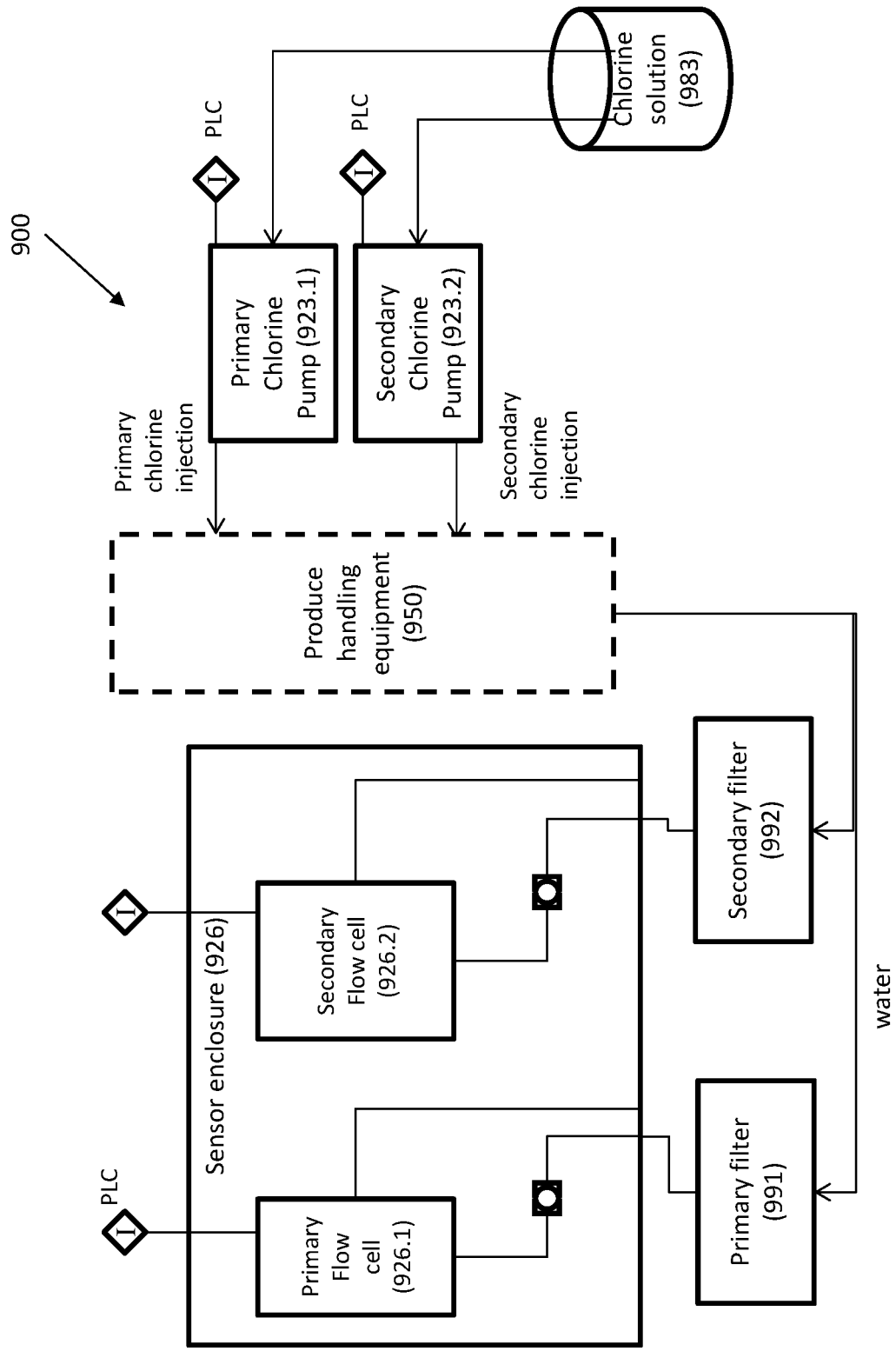
FIG. 9 is a block diagram of a control system for water used in produce processing that controls chlorine being added to the water for washing produce, in accordance with certain aspects of the present disclosure.

Plumbing and electrical layout of one or more cases are illustrated in FIGS. 7, 8, and 9. These diagrams assist in organizing the flow of information and data in this complex system.

Turning now to FIG. 1, as shown, FIG. 1 is a block diagram of a control system 100 for water used in produce processing, which may be called a water control system or an Automated Smart Wash Analytical Platform (ASAP) 100, and a produce wash equipment 150, which may also be referred to herein as a produce handling device 150, in accordance with one or more embodiments. As shown a control system 100 includes a logic processor 110 that can also be called a controller 110. The logic processor 110 is provided such that is can communicate and receive data from all the other elements of the control system 100. The logic processor 110 can also take the received data from other elements of the control system (such as the HMI 140, sensor 120, and pump 130), or from devices as location outside the control system 100 (such as the produce handling equipment 150 or other external devices or databases). In accordance with one or more embodiments, the logic processor/controller 110 can take any of the received data or subset thereof and process the data to generate analysis output that can be provided to the HMI 140 for display to a user. Additionally the data can be used by the controller 110 for generating control signals for controlling elements connected to the controller 110.

For example, according to one or more embodiments, the logic processor 110 receives sensor data from at least the sensor 120, user input from the HMI 140 from one or more users, and data from the pump 130. The logic processor 110 can also receive data from the produce handling equipment 150. Further the logic processor 110 can also receive data from other control systems, or other databases. The logic processor 110 then takes all or part of this received data and generates control signals that can be transmitted to one or more of the other elements of the control system 100

Physically, the logic processor 110 can be implemented using a select number of logic circuit elements that can be integrated into one or more other physical devices in the overall control system 100 or even within an element of the produce handling equipment 150 or combination thereof. For example, a physical processing core can be integrated into the sensor 120 or in the HMI 140 that serves as the logic processor 110. In another example, a processing core can be provided in the pump 130 or in the produce handling equipment 150. In another embodiment the logic processor 110 can be a stand-alone computing system. This can include but is not limited to an on-site server, an off-site server, a distributed server arrangement, a cloud computing system, a portable electronic device, and/or a combination.

The control system 100 also include a human machine interface (HMI) 140 that is connected to the logic processor 110 such that the HMI 140 can receive and provide data to and from a user and the logic processor 110. The HMI 140 can be for example, but is not limited to, a touchscreen, a monitor, a speaker system, a combination thereof, and/or any other device capable of transmitting and receives data from a user. For example, the HMI 140 can be a stationary computer station, a mobile computing device such as a tablet, cellular phone, laptop, and/or wearable electronic. The HMI 140 can also be a speaker system such as a stationary speaker system mounted in a facility or an integrated speaker system in an electronic device. Further, the HMI 140 can be a combination of electronic display, sound, and camera devices. An HMI 140 that includes one or more camera devices can receive inputs from a user in the form of gestures or movements. Also the HMI 140 can include a microphone so that is can receive audio input from a user. Further, the HMI 140 can receive input from the user using a keyboard, mouse, or touchscreen as well. The HMI 140, when implements as a mobile device, can also receive input in the form of a movement, such as a shake or waving of the device by a user, that is detected by movement sensors in the mobile device. The HMI 140 can then provide one or more of the received inputs to the logic processor 110. Further, in another embodiment, the HMI 140 can process the data and provide the results of the processing to the logic process 110 in an effort to alleviate the processing load on the logic processor 110.

The control system may include at least one sensor 120. As shown, in other embodiments the control system 100 can include a plurality of sensors. In one embodiment, the sensor 120 can be a pH sensor that can detect a pH level in a fluid that is run through the sensor. The fluid can be the wash solution that includes water and possibly other chemical and debris from the produce handling equipment 150. In another embodiment, the sensor 120 can be a chlorine sensor that detects a chlorine level in the fluid that is run through the sensor. Further, in other embodiments, the sensor 120 can be a temperature gauge, a microphone, an imaging device such as a camera or video camera, or other known sensors. Further, a plurality of sensors can be included that can all be providing collected data to the logic processor 110. The sensor 120 can be provided elsewhere, near, adjacent to, attached to, and/or within the produce handling equipment 150. For example, the sensor 120 can be located at a distance from the produce handling equipment 150 while being connected using a sampling hose that transports the fluid to be tested to the sensor 120. In another embodiment, the sensor can be provided connected to or within the produce handling equipment 150.

Additionally, the control system 100 may include at least one pump 130. In other embodiments, the control system 100 and include a plurality of pumps. The pump 130 can be a chemical pump that pumps a select wash solution into the water of the produce handling equipment that is being used to wash produce being processed. For example, the pump 130 can be a pH solution pump, or in another embodiment a chlorine pump. The pump 130 can also pump a wash solution that includes a number of chemical. The pump 130 receives control signals from the logic controller 110 that indicate to the pump when to pump, for how long to pump, and how fast the pump should operate.

Figure 2:
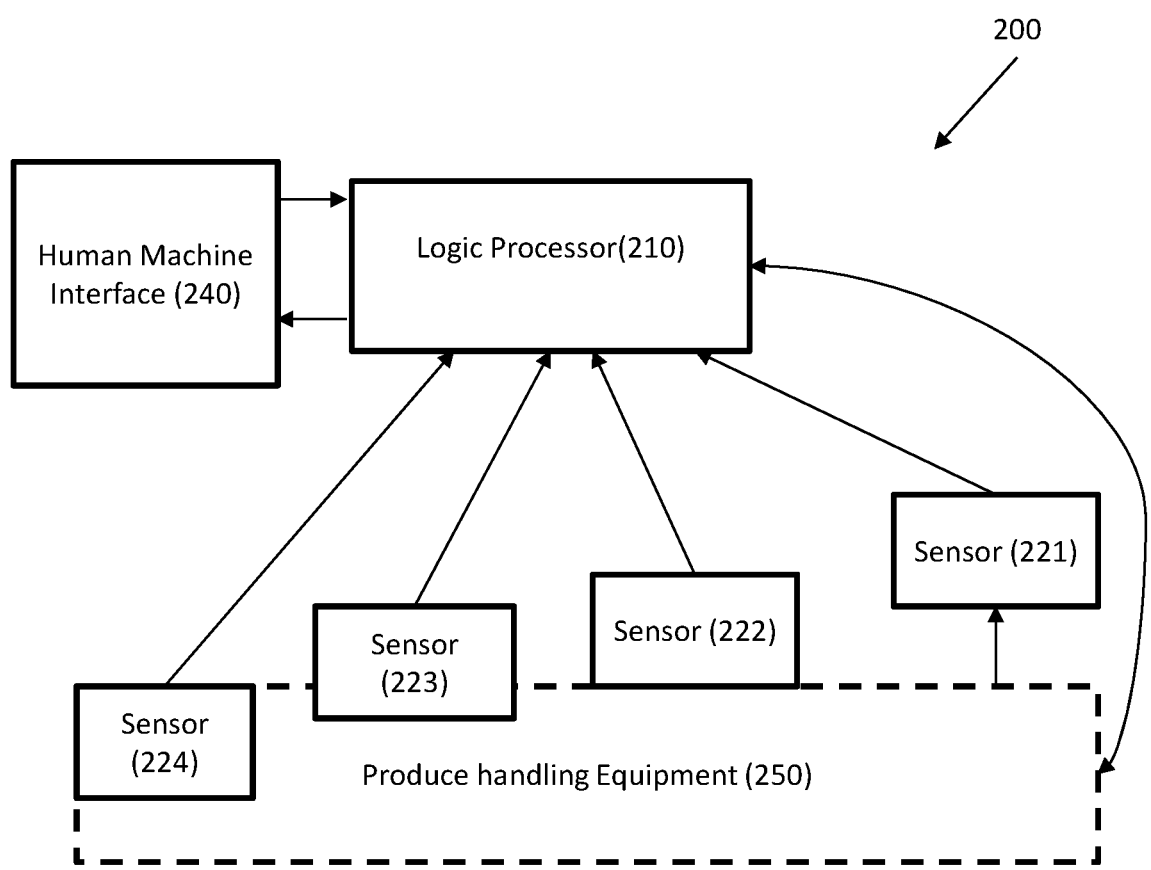
FIG. 2 is a block diagram of a control system for water used in produce processing with examples of sensor placement, in accordance with certain aspects of the present disclosure.

FIG. 2 is a block diagram of a control system 200, or ASAP 200, for water used in produce processing with examples of sensor placement in accordance with one or more embodiments. As shown, the control system 200 includes a logic processor 210 that is connected to a human machine interface 240 as well as a plurality of sensors 221, 222, 223, and 224. The sensors 221, 222, 223, and 224 are each shown at a different representative location in relation to produce handling equipment 250 that the sensors 221, 222, 223, and 224 are monitoring. The sensors 221, 222, 223, and 224 can be placed as shown at all different locations, all at any one positions, or a combination thereof.

Looking specifically at each of the sensors, a sensor 221 can be provided away from the produce handling equipment 250. For example, a pH or chlorine sensor can be placed at a location and be connected to the equipment 250 using a sampling hose that carries water from the equipment 250 to the sensor 221. In another embodiment, the sensor 221 can be a camera or microphone. This arrangement allows for the control system 200 to be provided at a central testing location to be installed in a plant setting away from any of the produce handling equipment lines in the plant. Sensor 222 can be placed adjacent to or connected to the produce handling equipment 250. For example, a sensor can be mounted on the outside of the produce handling equipment were the sensor 222 can be directly provided samples or inputs for testing. The sensor 223 is provided such that part of the sensor can extend into the produce handling equipment 250. For example, sensor 223 can be mostly mounted to an outer surface of the produce wash equipment with a probe extending into the equipment 250. Further, sensor 224 shows that a sensor can be provided completely within or submerged in the produce handling equipment 250.

Figure 3:
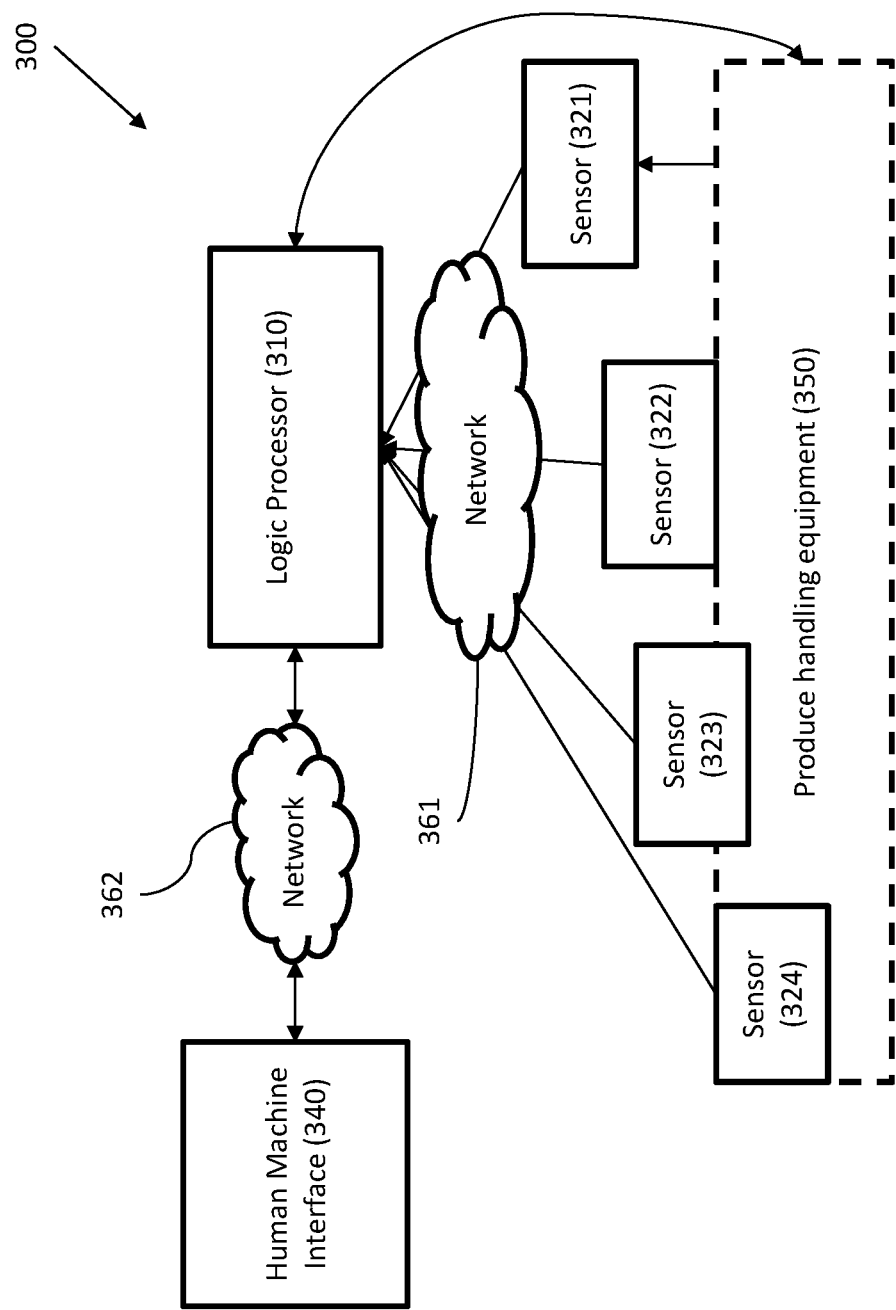
FIG. 3 is a block diagram of a control system for water used in produce processing showing examples of network integration, in accordance with certain aspects of the present disclosure.

FIG. 3 is a block diagram of a control system 300, or ASAP 300, for water used in produce processing showing examples of network integration in accordance with one or more embodiments. As shown the control system 300 includes a logic processor 310, a HMI 340, and sensors 321, 322, 323, and 324 provided to collected data from produce handling equipment 350. The HMI 340 is similar to the above discussed HMI 140 of FIG. 1. Similarly, sensors 321, 322, 323, and 324 are similar to sensors 221, 222, 223, and 224 of FIG. 2. Further, the control system now includes one or more networks 361 and 361 that can be used to connect elements of the control system 300 that are no longer directly connected with the logic processor 310. Specifically, as shown a network 361 can be used to connect sensors 321, 322, 323, and 324 to the logic processor 310. For example, the network 361 can include a local area network (LAN) and associated device resources that provide a communication path for the sensors to communicate with the logic processor. The network 361 can be a wired system, a wireless system, or a combination thereof. The network 361 can also be a wide area network (WAN) or even can represent a connection through the internet that would traverse a number of network elements now included in the network 361. This allows for the placement of the logic processor 310 to effectively be placed anywhere.

Further, the system 300 includes a network 362 as well that connects the HMI 340 and the logic processor 310. The network 362 can include a local area network (LAN) and associated device resources that provide a communication path for the HMI 340 to communicate with the logic processor. The network 362 can be a wired system, a wireless system, or a combination thereof. The network 362 can also be a wide area network (WAN) or even can represent a connection through the internet that would traverse a number of network elements now included in the network 362. This allows for the placement of the logic processor 310 and the HMI 340 to effectively be placed anywhere. For example, the HMI 340 could be a portable electronic device that the user carries with them within the plant or even outside the plant. Similarly, the logic processor 310 can be located on-site, off-site, or a combination thereof.

Figure 4:
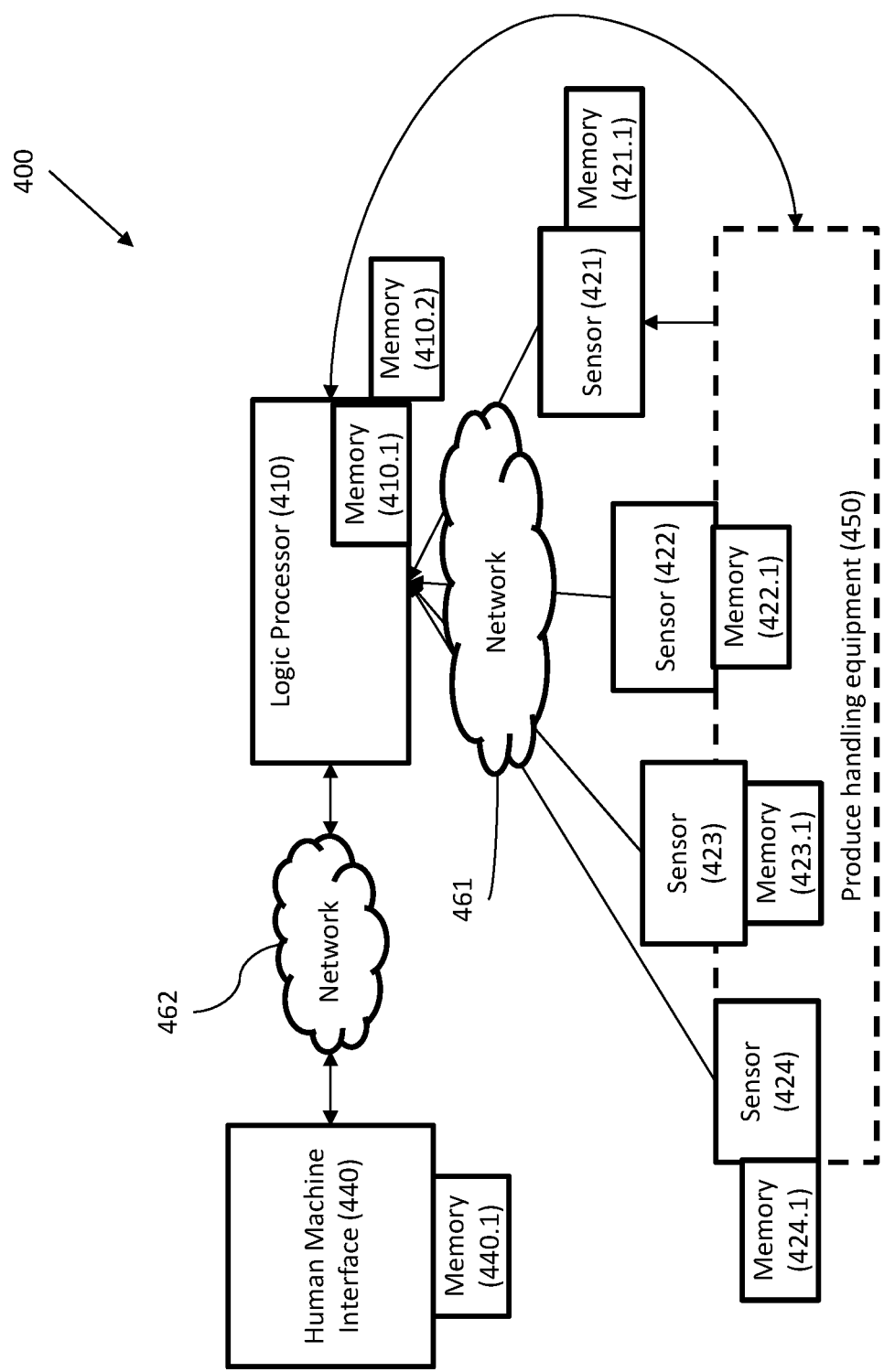
FIG. 4 is a block diagram of a control system for water used in produce processing with examples of data storage memory locations, in accordance with certain aspects of the present disclosure.

FIG. 4 is a block diagram of a control system 400, or ASAP 400, for water used in produce processing with examples of data storage memory locations in accordance with one or more embodiments. The control system 400 includes a HMI 440, a logic processor 410, sensors 421, 422, 423, and 424, and networks 461 and 462 that are similar to the similar elements in FIGS. 2 and 3. Specifically, the HMI 240, logic processor 210, sensors 221, 222, 223, and 224 from FIG. 1 and networks 361 and 362 from FIG. 2, respectively.

Further, the control system can include one or more of the shown memory devices or locations. The memory devices can be provided in the form of integrated random access memory (RAM), read-only memory (ROM), a cache, or any other known memory arrangement. These integrated memory elements can be provided as, for example, a static integrated circuit, a hard drives, floppy disc, optical drive, or any other known memory type. Further, the memory devices can also be stand along memory devices in the form of USB data drives or external hard drives or even distributed cloud computing storage solutions. For example, looking specifically at FIG. 4, the HMI 440 can include a memory device 440.1. This memory device 440.1 can be a universal serial bus (USB) thumb drive, an integrated or external hard drive, or any other memory device and/or combination thereof. Additionally, according to one or more embodiments, control system 400 elements can include a plurality of memory devices. For example, the logic processor 410 can include a first memory device 410.1 and can also include a second external memory device 410.2. The first memory device 410.1 can be an internal form of memory while the second memory device 410.2 can be an external memory device such as a USB thumb drive. Further, according to one or more embodiments, any one of the sensors 421, 422, 423, and 424 can each also include one or more forms of memory devices 421.1, 422.1, 423.1, and 424.1 as shown. Further, according to one or more embodiments, an external detachable memory element, such as a USB thumb drive 421.1, can be detached from a sensor 421 and can then be directly connected to another device such as the logic processor 410 transferring the data from the memory device 421.1 to the logic processor 410. This process can also be done in the reverse carrying data such as control signals to a sensor or other device in the system.

Figure 5:
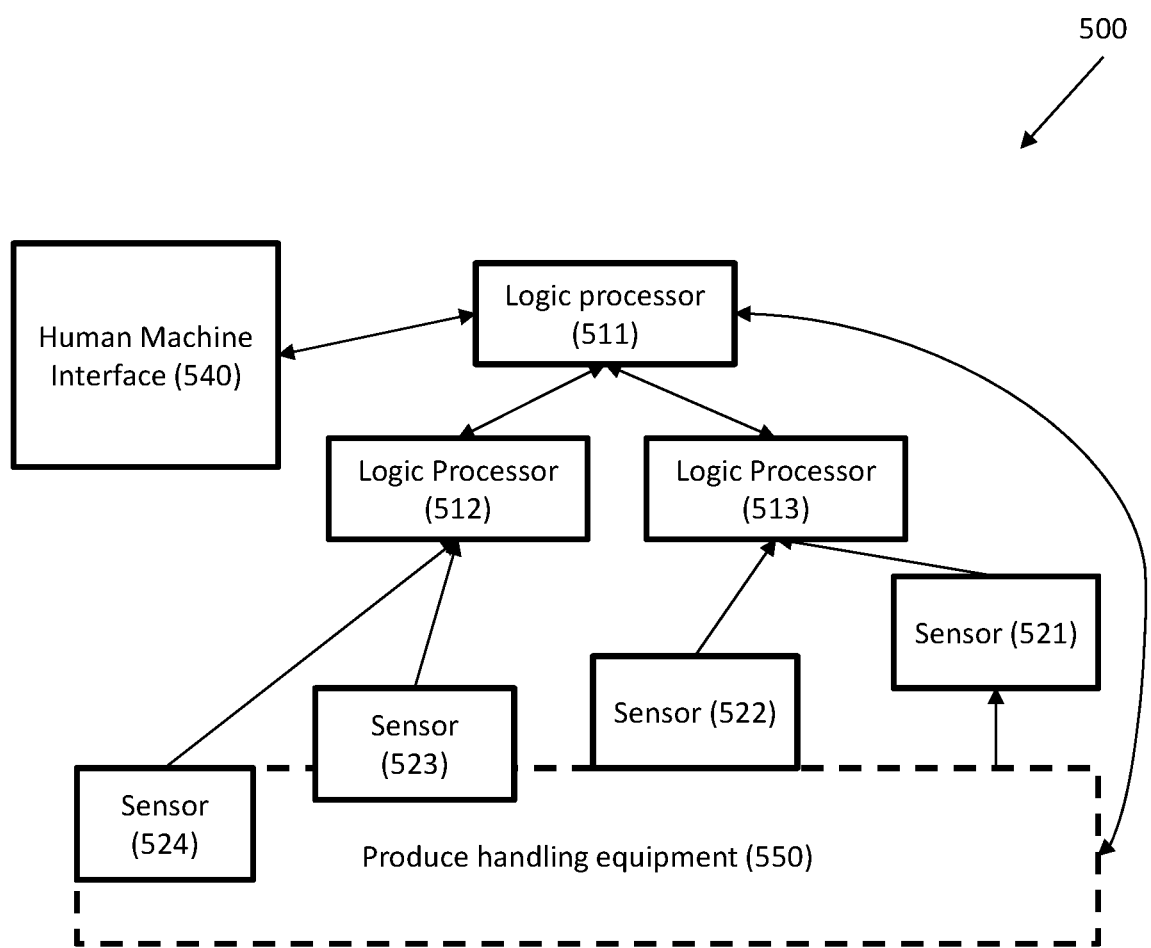
FIG. 5 is a block diagram of a control system for water used in produce processing with distributed processing control, in accordance with certain aspects of the present disclosure.

FIG. 5 is a block diagram of a control system 500, or ASAP 500, for water used in produce processing with distributed processing control in accordance with one or more embodiments. The control system 500 includes a HMI 540, and sensors 521, 522, 523, and 524. In other embodiments the control system 500 can have more or less sensors and their placement can also vary as well as their type. In this embodiment the logic processor/controller is explicitly show has a distributed system. Specifically the control system 500 can include a number of logic processors 511, 512, and 513. As shown the logic processor 512 for example can handle a subset of the sensors. For example, the logic processor 512 can be connected to chlorine sensors 523 and 524 in the system and can therefore conduct all the specific data processing associated with the type of sensor data. The logic processor 513 is show to connect with a different subset of sensors. For example, the logic processor 513 can connect to pH sensors 522 and 521 found in the system. The logic processors 512 and 513 can then send specifically processed data to the logic process 511 which can conduct additional overarching processing and send that to be displayed to a user using the HMI 540.

According to other embodiments, there can be include more or less logic processors than those shown. For example each sensor can have its own logic processor or any variation thereof can be provided. Further, according to other embodiments, the logic processor 512 and logic processor 513 may connect to sensors not based on their type but rather another characteristic such as location or processing requirements to produce a specifically desired output.

Figure 6:
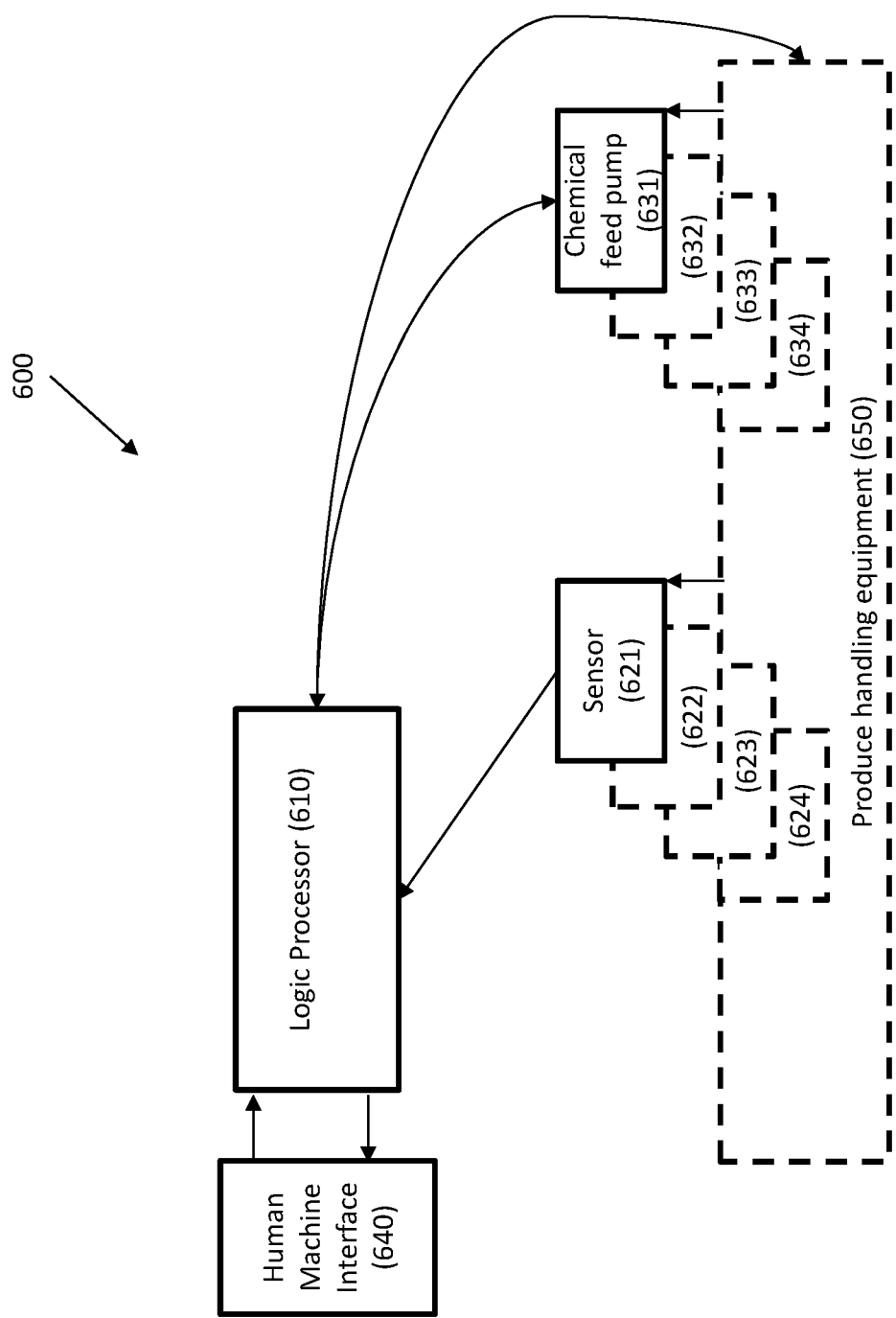
FIG. 6 is a block diagram of a control system for water used in produce processing including pumps controlled by control signals, in accordance with certain aspects of the present disclosure.

FIG. 6 is a block diagram of a control system 600, or ASAP 600, for water used in produce processing including control signals and pumps that are controlled by the control signals in accordance with one or more embodiments. Specifically, as shown, the control system 600 includes one or more pumps 631, 632, 633, and 634. According to one or more embodiments, the chemical feed pump 631 can be provided away from, adjacent to, partially within, or totally within the produce handling equipment 650. Further, according to other embodiments, the pumps 632, 633, and 634 can be provided at different location as well. One or more of the chemical pumps 631, 632, 633, and 634 can pump produce wash chemicals such as chlorine and/or a combination of chemicals that make up a was solution. For example, a commercial system for a two stage leafy green wash line might include six pumps to allow control of chlorine in each stage, and two additional pumps to control an acid wash adjuvant that is suitable for organic or conventional production allowing for ease in line conversion from organic to conventional production. The reverse conversion can also be done but it is less useful because a full wash down is required to prevent carry over into the organic production.

Further the control system 600 includes a logic processor 610 that receives data from one or more sensors 621, 622, 623, and 624. The logic processor 610 can also receive data from a HMI 640. Further, the logic processor 610 can receive data from one or more of the chemical feed pumps 631, 632, 633, and 634. The logic processor 610 can then take all or part of the received data and process the data to come up with control signals. The control signals can then be transmitted to, for example, the chemical feed pumps instructing the pump on when and how much to pump. For example, consider a leafy green processing line operating at a 15 ppm setpoint. As the chlorine levels begin to fall due to product flow and reaction, the controller will activate the chlorine pump. As the demand grows, the PID will begin anticipating the demand prompting greater and/or longer activation of the pump with the goal of maintaining a stable chlorine concentration in the wash system. Similar control will be exercised to control the pH.

FIG. 7 is a block diagram of a control system 700, or ASAP 700, for water used in produce processing that controls water pH for washing produce in accordance with one or more embodiments. The control system 700 includes a wash solution 781 reservoir that contains chemicals for washing produce such as sodium hypochlorite or Smart-Wash Solutions SW™ or any other materials that needs to be dosed into the line in a controlled manner. The control system 700 also includes a primary pH pump 721.1 that pumps the wash solution 781 into the produce handling equipment 750 and specifically into the water being using in the produce handling equipment 750 to wash the produce. The control system 700 also includes a secondary pH pump 721.1 that can also pump wash solution 781 into the produce handling equipment. Additional pumps can be added if wash solutions 781 is to be added at other locations in the produce handling equipment 750. Further the control system 700 can further include a second wash solution 782. This wash solution can be, for example, an organic wash solution. The control system can further include a primary organic pH pump 722.1 and a secondary organic pH pump 722.2 that are each able to pump the wash solution 782 into the produce handling equipment at different points and at different timing and amounts as indicated by received control signals generated by the control system.

Specifically, the control system 700 further includes a first sensor pHE-1 725.1 and a second sensor pHE-2 725.2 that are sensors that can detect and provide pH sensor data to a logic processor of the control system 700. The control system 700 can then take these sensor data and generate control signals for controlling the pumps 721.1, 721.2, 722.1 and 722.2. As shown, water samples from the produce handling equipment 750 are drawing into and through the sensors 725.1 and 725.2 that then output the pH sensor data for processing and/or storage. Further, the control system 700 includes a pH clean-in-place (CIP) enclosure 770. The CIP enclosure 770 is connected to the first and second sensors 725.2 and 725.2 and facilitates and conducts cleaning of itself and the sensors which is specifically described in FIG. 8.

FIG. 8 is a block diagram of a pH Clean-In-Place (CIP) enclosure 770 of a control system/ASAP, for water used in produce processing in accordance with one or more embodiments. As shown the CIP enclosure 770 is connected to both pH sensors 725.1 and 725.2. The CIP enclosure 770 includes internal solenoids 774 and 776 that are configured to control a flow path using valves 775 and 777 respectively. A cleaning air blast can be used to clean out either of the flow paths 775 and 777. Particularly, according to one or more embodiments, solenoids 774 and 776 control the valves 775 and 776 respectively when a cleaning event is triggered. The signal to command the solenoids to open the valves comes from the PLC. In some cases, an air blast device may be configured to deliver a filtered and oil free burst of air to dislodge adhering material on at least one sensor.

The CIP enclosure 770 further includes a Pressure Transmitter (PT) 773 that sends a signal to the PLC with the measurement of the air pressure in the CIP system. This measurement can be used to send an alarm that there is too much or too little air to function correctly. Further, the CIP enclosure 770 includes a filter 771 that protect an air regulator 772. The air regulator 772 regulates the air pressure to the desired operating pressure.

FIG. 9 is a block diagram of a control system 900, or ASAP 900, for water used in produce processing that controls chlorine being added to the water for washing produce in accordance with one or more embodiments. The control system 900 includes a sensor enclosure 926 that includes a primary flow cell 926.1 sensor and a secondary flow cell 926.2 sensor. The control system 900 further includes a primary filter 991 and a secondary filter 992 that is connected to the sensor enclosure 926. These filters 991 and 992 are connected to the produce handling equipment 950. The filters 991 and 992 pull water from the produce handling equipment 950 and filter the water discarding of some while passing the filtered water into the sensor enclosure 926 and into the primary and secondary flow cell sensors 926.1 and 926.2. The sensors 926.1 and 926.2 can then process the provided water, generate a sensor signal, and transmit that sensor signal out to a controller of the control system 900. The sensor signals can indicate the amount or lack thereof, of chlorine present in the water. The controller can generate control signals based on this sensor data and can provide those control signals to the primary and secondary chlorine pumps 923.1 and 923.2. The chlorine pumps include a primary chlorine pump 923.1 and a secondary chlorine pump 923.2. The primary chlorine pump 923.1 and the secondary chlorine pump 923.2 pull the chlorine solution 983 in accordance with the control signals each receive and provide that chlorine solution into the water in the produce handling equipment 950.

FIG. 10 is an illustration of a set of filters 1090 used in a control system for water used in produce processing in accordance with one or more embodiments. For example, the set of filters 1090 can be as one or both of the filters 991 and 992 as shown in FIG. 9. The set of filters 1090 include at least two sub-filters 1098 and 1099 that are connected in series with the output of a first filter 1098 feeding into the input of the second filter 1099. Initially, process water 1090.1 is input into the first filter 1098 as shown. Particles and water return 1090.2 that are collected by the filtering agent within the filter 1098 are discarded. Next, a stream of partially filtered water 1090.3 is output from the first filter 1098 and into the second filter 1099. The second filter again filters out particles and water and discards of the second set of particles and water 1090.4. What is left is prepared process water 1090.6 that is passed to one or more filters for testing of the water for chemical composition.

Figure 11:
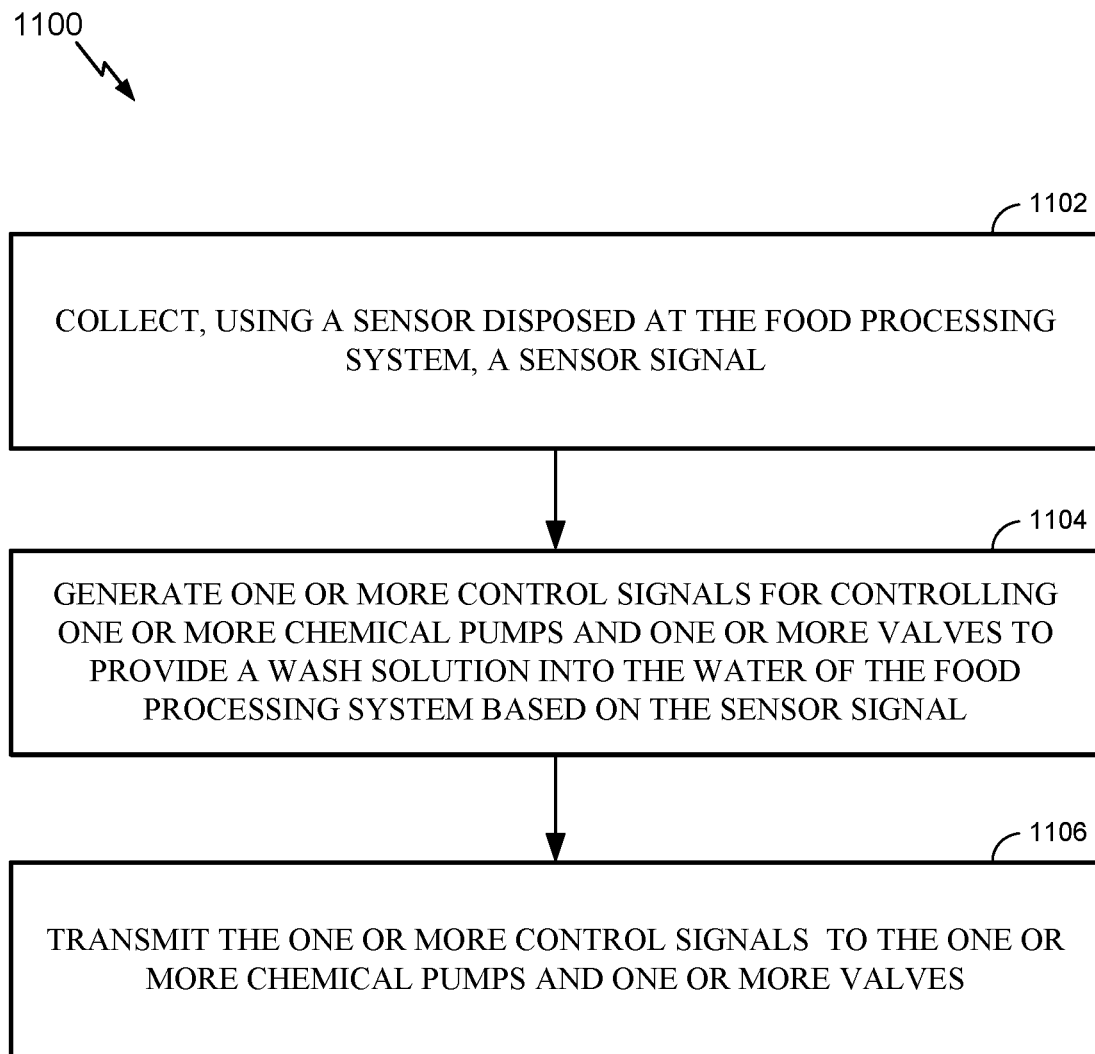
FIG. 11 is a flow chart of a method for using a control system for water used in produce processing, in accordance with certain aspects of the present disclosure.

FIG. 11 is a flow chart of operations 1100 for using a control system for controlling water used in produce processing in accordance with one or more embodiments. The operations 1100 includes collecting, using a sensor disposed at the food processing system, a sensor signal (operation 1102). The operations 1100 also includes generating one or more control signals for controlling one or more chemical pumps and one or more valves to provide a wash solution into the water of the food processing system based on the sensor signal (operation 1104). The operations 1100 further include transmitting the one or more control signals to the one or more chemical pumps and one or more valves (operation 1106).

In spite of recent advances in wash process control as discussed herein, there are still challenges. Oft times, the control systems as described herein may be operated in cold and/or wet environments. Such environments may be deleterious to the performance of electronic components. Failure of these potentially critical electronic components may present a potential food safety hazard. The control of wash process is critical to many food processing operations. Manual control is increasingly inadequate. Therefore wash process control is increasingly handled by control systems such as described herein in one or more disclosed embodiments and examples. Further, additional features may be provided that may further improve and care for instrumentation as described herein that is used to manage wash processes.

In accordance with one or more cases, chlorine monitoring and maintenance may be improved through the implementation of, for example, calibration and/or electrode cleaning. The importance and mechanics of chlorine electrode calibration are described herein. However, chlorine electrodes and flow cells can be fouled by deposits that can tan to black in color. These deposits can be cleaned manually by disassembly and manual scrubbing with an acid cleaner. Although this may be an adequate way to end up with a clean sensor, the process and need to stop the produce processing, remove, disassemble, reassembly, and reinstall the sensor. This is not only time consuming but also costly and imposes both wear and tear on the sensor parts such as the electrodes as well as provides a complex disassemble/assemble procedure that may lead to erroneous implementation leading to sensor damage and possible food safety concerns.

Figure 12:
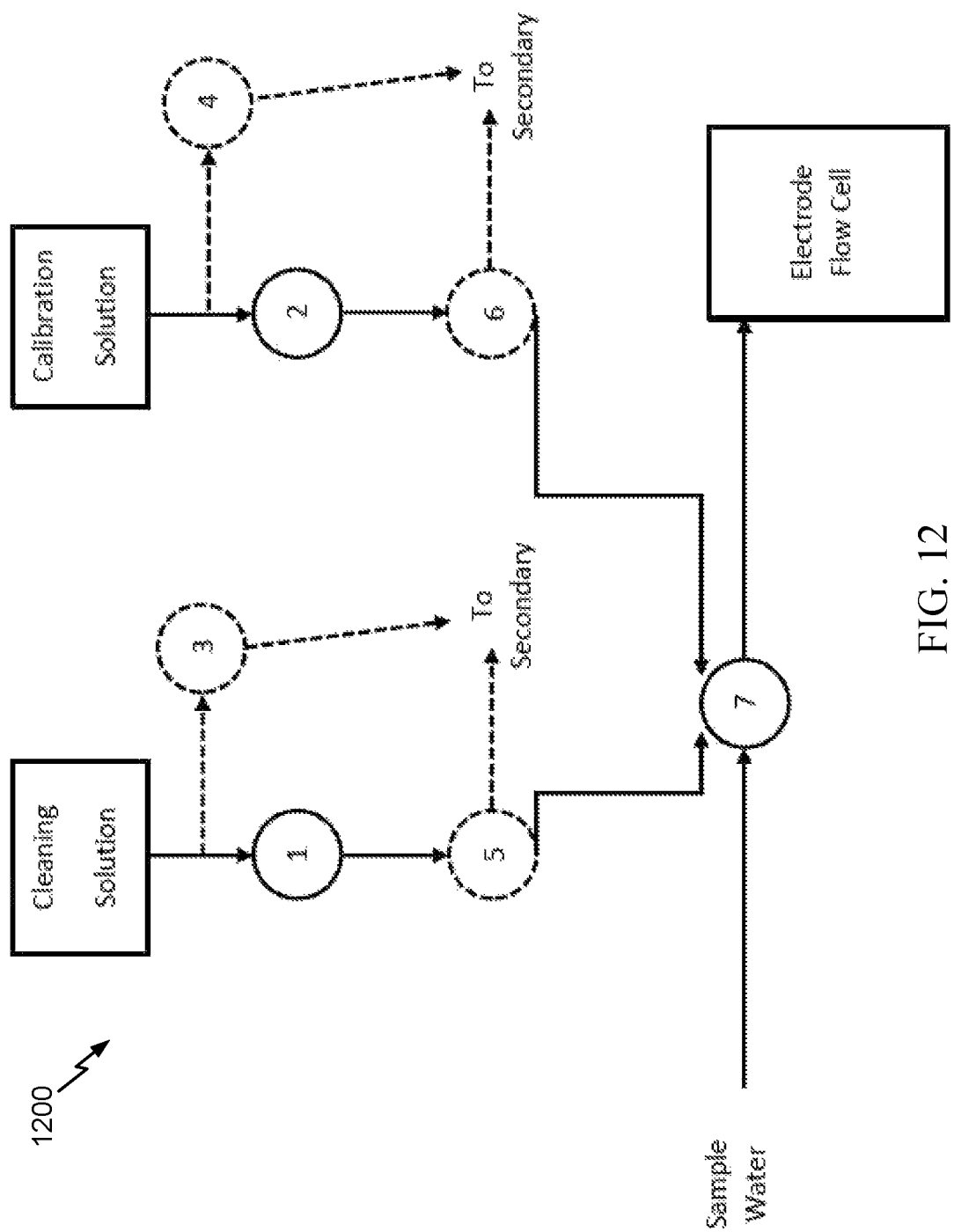
FIG. 12 is a block diagram of a control system with cleaning and calibration elements used in produce processing, in accordance with certain aspects of the present disclosure.
Figure 13:
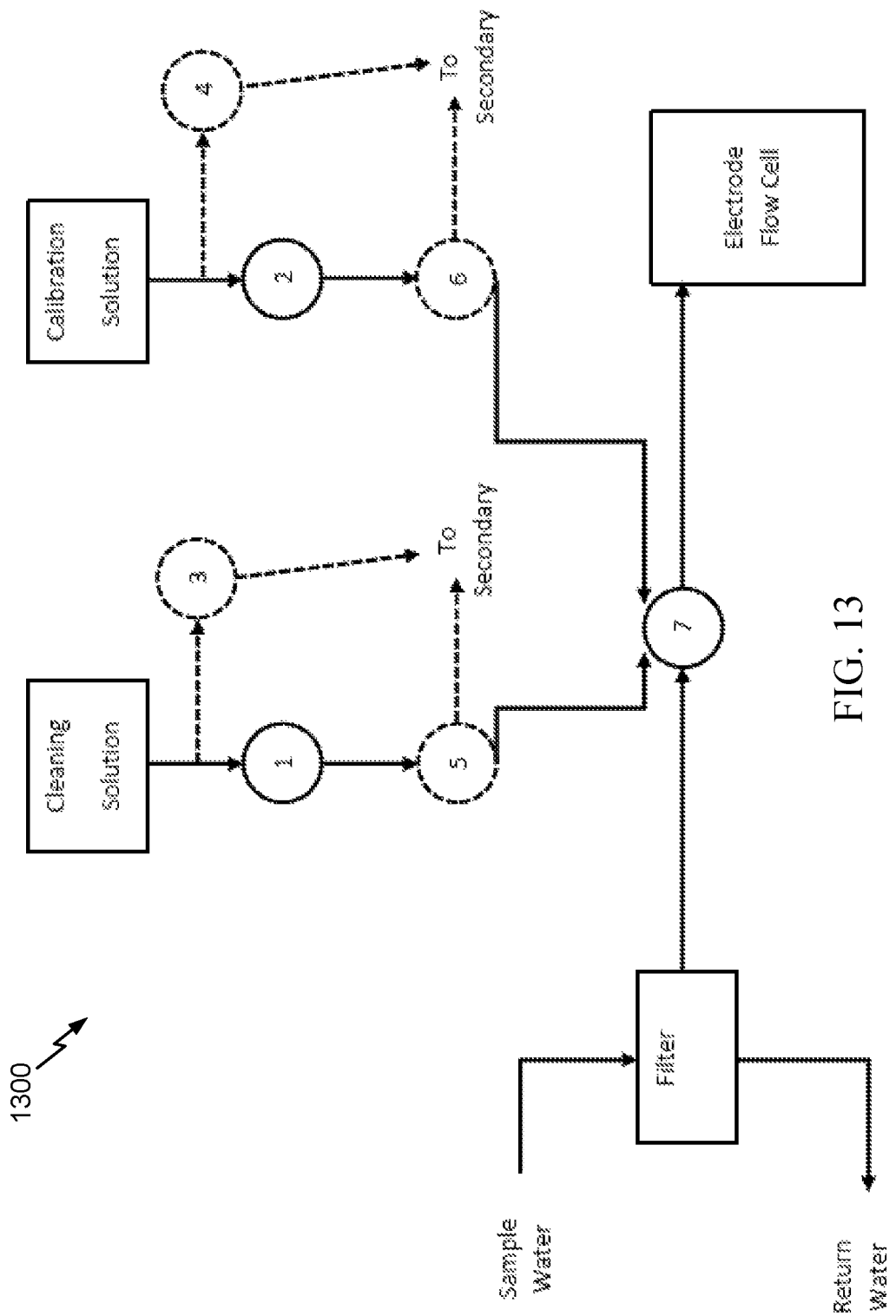
FIG. 13 is a block diagram of a control system with cleaning and calibration elements and a filter used in produce processing, in accordance with certain aspects of the present disclosure.

According to one or more cases, a feature that may be provided is a clean-in-place option that avoids the disassembly and manual scrubbing. For example, a general example of this is shown in FIG. 7 element 770. A specific implementation is further shown in FIG. 8. Other cases are shown in FIGS. 12 and 13 that include other specific examples that include passing a liquid cleaning and/or calibration solution through the electrodes/sensors. An oxidizing acid solution will rapidly dissolve deposits that may be found on or near an electrode flow cell. Many oxidizing acids are known including but not limited to nitric acid, chromic acid, and peroxy acids of various organic acids. In some cases, a peroxy acetic acid for cleaning may be selected because the acid is commercially available in food grade qualities making it highly compatible with use in a food processing environment.

Turning now to FIG. 12, a block diagram of a control system 1200 with cleaning and calibration elements used in produce processing is shown. The control system 1200 includes a fluid receptacle that contains a cleaning solution connected to a primary cleaning solution dosing pump 1. The dosing pump 1 is further connected to a multi-way selector valve 7. The control system also includes a calibration solution connected to a calibration solution dosing pump 2. The dosing pump 2 is further connected to the multi-way selector valve 7. In addition to receiving cleaning solution and calibration solution, the selector valve 7 also receives sample water. The selector valve 7 can switch between any of these options and provide a selected flow to an electrode flow cell. In one or more cases, the control system 1200 may also include an optional dosing pump 3 and an optional multi-way valve 5 that provide cleaning solution to a secondary electrode flow cell. Further, the control system 1200 may include another optional dosing pump 4 and another optional multi-way valve 6 for providing calibration solution to the secondary electrode flow cell.

FIG. 13 is a block diagram of a control system 1300 with cleaning and calibration elements identical to FIG. 12. The control system 1300 may further include a filter that filters the incoming sample water that is then provided to the electrode flow cell. The filter may also include a return water path. In some cases, the water filter may be included that is configured to filter sample water provided to at least one sensor and return excess sample water when a multi-way valve is engaged to provide at least one of a cleaning solution or a calibration solution to the at least one sensor instead of the sample water.

In one or more cases, peroxy acetic acid is gentle enough that deleterious effects on the electrode and housing may not be apparent over a broad range of concentrations including up to 50%. However, 50% may be much more concentrated than necessary to achieve the cleaning of the electrode. At the lower end, the cleaning time begins to increase below about 2% when the electrode and housing are between 40 and 80 degrees F. At less than about 0.5% the cleaning is less complete in reasonable times. In accordance with one case, a recommended cleaning is therefore 2% peroxy acetic acid for 15 minutes to overnight. In other cases, time, temperature, and concentration can be adjusted against each other to generate other cleaning protocols. This embodiment is simple and effective for use in most process environments where chlorine monitoring is performed with the referenced automated system.

To gain further improvements in the maintenance process for such controllers, the use of a solution can be automated with robotic valves controlled by a controller such as a PLC or by manual selection. The ability to select between process water, no flow, cleaning solution such as the described 2% solution, and calibration solution may reduce the need for human intervention during the regular activities of cleaning and calibration. It accordance with one or more cases, control may be achieved through a series of binary valves or a single multichannel valve. The decision between options may be based on the cost and reliability of the components as well as sensor feedback values.

In one or more cases, in a steady state operation, the electrode and flow cell are placed in the cleaning solution for 15 minutes or more. The solution is made static but switched to no flow to allow cleaning to occur after about three volumes of solution have flushed the system. The solution could be allowed to flow continuously but this is not required. At start up the electrode and flow cell are reconnected to process water to flush the system. As the line systems all stabilize, the calibration solution is selected to confirm the calibration or initiate a calibration is needed. When this is completed, the flow of process water is restored to return to normal automation. These procedures may be implemented using the system 1200 presented in FIG. 12.

Additionally, the maintenance of these machines, devices, and systems takes people and scheduling. Time spent on maintenance is time a line is not producing product. Accordingly it can be appreciated that automation of the maintenance activities has impacts beyond just the labor savings. In one case, a robotic valve may used to select the delivery of process water, calibration solution, or electrode cleaning solution allowing increased automation in maintenance activities.

The environment where these control systems operate can be very challenging. The moist air, the changing temperatures, and the sanitary wash downs are threats to the reliability of the control system electronics.

Thus, in one or more cases, the electronics of the controller are held under pressure greater than ambient with dry air to retard water migration. Specifically, electronics may be housed in cabinets designed for this purpose with appropriate gasketed doors and cable openings to mitigate the entry of these environmental conditions. For example, in one or more cases, a small positive pressure, about 4 inches of water, with dry air may be provided which may mitigate threats to reliability by preventing the ingress of moisture and moist air. In accordance with one or more cases, adding air pressure to the electronic cabinets of an ASAP may help prevent moisture entry and prevent mold growth. For example, pressurized enclosure may be provide for logic processors/controllers 110, 210, 310, 410, 511, 512, 513, and 610 as shown in FIGS. 1-6. Additionally, a pressurized enclosure may also be provided for the human machine interfaces as well as for any of the electronics of sensors as disclosed herein. Further, pressurized enclosures may be provided for memory devices as shown, for example, in FIG. 4.

These improvements can be used in tandem or individually to improve the reliability of wash process control equipment.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof.

Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sensor control system of a food processing system, comprising:
    a logic processor operatively coupled to an electrode, the logic processor being configured to:
        receive a sensor signal from the electrode, the electrode being configured to generate the sensor signal based on a chemical parameter of water used within the food processing system; and
        generate an electrochemical cleaning control signal for the electrode to interact with the water to electrochemically clean the electrode based upon a user input signal.

2. The sensor control system of claim 1, wherein the electrode comprises a chlorine electrode such that the logic processor is configured to determine an amount of chlorine in the water.

3. The sensor control system of claim 1, further comprising an additional logic processor operatively coupled to the electrode, the additional logic processor being configured to generate, based on the sensor signal, a control signal to control adding a wash solution to the water used in the food processing system.

4. The sensor control system of claim 1, wherein the logic processor is configured to receive the user input signal through a human machine interface (HMI) configured to display information from the logic processor.

5. A method of controlling water used within a food processing system, comprising:
    collecting a sensor signal from an electrode that contacts the water used within the food processing system; and
    generating a sensor cleaning control signal causing electrochemical cleaning of the electrode based upon a user input signal.

6. The method of claim 5, wherein the sensor cleaning control signal causes the electrochemical cleaning by causing at least one of:
    reversing a polarity of the electrode; or
    changing a potential applied to the electrode.

7. The method of claim 6, further comprising sending the sensor cleaning control signal to a fouling control device operably coupled to the electrode.

8. The method of claim 5, further comprising processing the sensor signal to determine a chemical measurement of the water, wherein the electrode comprises a chlorine electrode and wherein the chemical measurement comprises an amount of chlorine in the water.

9. The method of claim 5, further comprising:
    processing the sensor signal to determine a chemical measurement of the water; and
    adding a wash solution to the water based upon the chemical measurement of the water.

10. The method of claim 9, wherein the adding the wash solution to the water comprises:
    generating a control signal based upon the chemical measurement of the water; and
    pumping the wash solution at a rate based upon the control signal.

11. A control system for a food processing system, comprising:
    a sensor configured to generate a sensor signal from water used within the food processing system;
    a fouling control device configured to clean the sensor; and
    a logic processor operatively coupled to the sensor and to the fouling control device, the logic processor being configured to receive the sensor signal from the sensor, process the sensor signal to determine a chemical measurement of the water, and generate a sensor cleaning control signal causing the fouling control device to clean the sensor.

12. The control system of claim 11, further comprising a human machine interface (HMI) configured to display information from the logic processor.

13. The control system of claim 11, wherein the fouling control device comprises a set of cascaded filters coupled between the food processing system and the sensor, and wherein the set of cascaded filters comprises a first tangential flow filter connected with a second tangential flow filter.

14. The control system of claim 11, further comprising an additional logic processor operatively coupled to the sensor, the additional logic processor being configured to generate, based on the sensor signal, a control signal to control adding a wash solution to the water used in the food processing system.

15. The control system of claim 11, wherein the fouling control device comprises an air blast device configured to deliver a burst of air to the sensor to dislodge adhering material on the sensor.

16. The control system of claim 11, wherein the fouling control device comprises a fluid receptacle that is configured to contain a cleaning solution, and wherein the cleaning solution comprises from 2% to 50% by weight peroxy acetic acid.

17. The control system of claim 16, further comprising a calibration solution device configured to deliver a calibration solution to the sensor.

18. The control system of claim 17, further comprising a multi-way valve configured to selectively provide to the sensor the cleaning solution, the calibration solution, or the water used in the food processing system.

19. The control system of claim 11, wherein the sensor comprises a pH electrode or a chlorine electrode.

20. The control system of claim 11, wherein the sensor comprises a chlorine electrode, the chemical measurement comprises an amount of chlorine in the water, and the fouling control device is part of an electrochemical cleaning device.

21. The control system of claim 20, wherein the electrochemical cleaning device comprises the logic processor and the chlorine electrode such that the logic processor is configured to generate the sensor cleaning control signal for the chlorine electrode to interact with the water to electrochemically clean the chlorine electrode based upon a user input signal.

22. The control system of claim 11, further comprising a pump that is configured to pump a wash solution into the water in the food processing system based on the sensor signal.

23. The sensor control system of claim 1, wherein the logic processor is further configured to generate, based on the sensor signal, a control signal to control adding a wash solution to the water used in the food processing system.

24. The control system of claim 11, wherein the logic processor is further configured to generate, based on the sensor signal, a control signal to control adding a wash solution to the water used in the food processing system.

* * * * *